United States Patent
Li

(10) Patent No.: US 12,186,661 B2
(45) Date of Patent: Jan. 7, 2025

(54) METHOD AND APPARATUS FOR SELECTING ABILITY OF VIRTUAL OBJECT, DEVICE, MEDIUM, AND PROGRAM PRODUCT

(71) Applicant: Tencent Technology (Shenzhen) Company Limited, Shenzhen (CN)

(72) Inventor: Zhengxu Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 219 days.

(21) Appl. No.: 17/871,743

(22) Filed: Jul. 22, 2022

(65) Prior Publication Data

US 2022/0355202 A1 Nov. 10, 2022

Related U.S. Application Data

(63) Continuation of application No. PCT/CN2021/122678, filed on Oct. 8, 2021.

(30) Foreign Application Priority Data

Oct. 22, 2020 (CN) .......................... 202011140965.2

(51) Int. Cl.
*A63F 13/537* (2014.01)

(52) U.S. Cl.
CPC .................. *A63F 13/537* (2014.09)

(58) Field of Classification Search
CPC ...... A63F 13/537; A63F 13/822; A63F 13/69; A63F 13/533; A63F 13/67
See application file for complete search history.

(56) References Cited

U.S. PATENT DOCUMENTS

2002/0198046 A1* 12/2002 Nakazawa .............. A63F 13/10
 463/31
2007/0060347 A1* 3/2007 Itou ........................ A63F 13/35
 463/31

(Continued)

FOREIGN PATENT DOCUMENTS

CN 101795737 A 8/2010
CN 110833695 A 2/2020

(Continued)

OTHER PUBLICATIONS

SirJames | Gamerfuzion, "Assassin's Creed Unity Skill Tree" available at https://www.youtube.com/watch?v=QzDRwZFkVCo, Nov. 8, 2014 (Year: 2014).*

(Continued)

*Primary Examiner* — Jay Trent Liddle
(74) *Attorney, Agent, or Firm* — Morgan, Lewis & Bockius LLP

(57) ABSTRACT

This application discloses a method for selecting an ability of a virtual object in a virtual battle performed by a computer device. The method includes: displaying a first ability identifier of a first ability, the first ability being an ability configured for the virtual object to perform the first ability at a first level in a virtual battle; displaying at least two second ability identifiers of at least second abilities associated with the virtual object in response to the virtual object changing from the first level to a second level in the virtual battle, the second abilities corresponding to the second level, and the at least two second ability identifiers comprising a target second ability identifier; receiving a selection operation on the target second ability identifier; and replacing the first ability with a second ability according to the selection operation.

18 Claims, 14 Drawing Sheets

(56) References Cited

U.S. PATENT DOCUMENTS

| | | | |
|---|---|---|---|
| 2019/0209926 A1* | 7/2019 | Benedetto | A63F 13/35 |
| 2019/0329138 A1* | 10/2019 | Panesar | A63F 13/795 |
| 2020/0261797 A1* | 8/2020 | Tahkokallio | A63F 13/25 |
| 2021/0129023 A1* | 5/2021 | Jarzebinski | A63F 13/48 |

FOREIGN PATENT DOCUMENTS

| | | |
|---|---|---|
| CN | 111589116 A | 8/2020 |
| CN | 111760278 A | 10/2020 |
| CN | 112156471 A | 1/2021 |
| CN | 112156471 B | 9/2022 |
| JP | 2018118146 A | 8/2018 |

OTHER PUBLICATIONS

Stadose, "Assassin's Creed Unity Combat guide part 1—Skills, techniques and enemy types," available at https://www.youtube.com/watch?v=AjC1yShuNxE, Nov. 16, 2015 (Year: 2015).*

Parkin, Jeffrey, "Assassin's Creed Origins guide: Your abilities," available at https://www.polygon.com/assassins-creed-origins-guide/2017/12/27/16541802/abilities-skill-tree-ability-points-hunter-warrior-seer, Dec. 27, 2017 (Year: 2017).*

Bilibili, "DOTA2 version 7.0: a Detailed List of All Hero Talent Trees", Dec. 28, 2016, 2 pgs., Retrieved from the Internet: https://www.bilibili.com/video/BV1Rs411a7fb?from=search&seid=7106354545433681883&spm_id_from=333.337.0.0.

Tencent Technology, ISR, PCT/CN2021/122678, Jan. 7, 2022, 2 pgs.

Emotional Therapist, "Marvel Super War: Rocket Raccoon Skills Introduction, Gatling 3 Basic Attacks in 1 Second, Blasting and Laying Mine", Haokan Baidu, Sep. 26, 2020, 1 pg., Retrieved from the Internet: https://haokan.baidu.com/v?pd=wisenatural&vid=9018634349849026957.

Tencent Technology (Shenzhen) Company, Office Action, JP2022/573488, Sep. 12, 2023, 9 pgs.

Gigazine.net—"Pokemon Unite", Pokemon's first 5-on-5 team battle game announced Jun. 24, 2020, https://gigazine.net/news/20200624-pokemon-presents/, retrieved Aug. 7, 2023.

Tencent Technology, WO, PCT/CN2021/122678, Jan. 7, 2022, 6 pgs.

Tencent Technology, IPRP, PCT/CN2021/122678, Apr. 13, 2023, 7 pgs.

Tencent Technology, Vietnamese Office Action, VN Patent Application No. 1202206068, Jun. 25, 2024, 4 pgs.

Tencent Technology, Korean Office Action, KR Patent Application No. 10-2022-7040641, Oct. 28, 2024, 13 pgs.

YouTube.com, Pokémon Official YouTube Channel, "Pokémon Presents", Jun. 24, 2020, Retrieved from the Internet: https://www.youtube.com/watch?v=ANNYd8W73kM&t=87s.

* cited by examiner

METHOD AND APPARATUS FOR SELECTING ABILITY OF VIRTUAL OBJECT, DEVICE, MEDIUM, AND PROGRAM PRODUCT

CROSS-REFERENCE TO RELATED APPLICATIONS

This application is a continuation application of PCT Patent Application No. PCT/CN2021/122678, entitled "SKILL SELECTION METHOD AND APPARATUS FOR VIRTUAL OBJECT, AND DEVICE, MEDIUM AND PROGRAM PRODUCT" filed on Oct. 8, 2021, which claims priority to Chinese Patent Application No. 202011140965.2, filed with the State Intellectual Property Office of the People's Republic of China on Oct. 22, 2020, and entitled "METHOD AND APPARATUS FOR SELECTING ABILITY OF VIRTUAL OBJECT, DEVICE, MEDIUM, AND PROGRAM PRODUCT", all of which are incorporated herein by reference in their entirety.

FIELD OF THE TECHNOLOGY

Embodiments of this application relate to the field of virtual environments, and in particular, to a method and an apparatus for selecting an ability of a virtual object, a device, a medium, and a program product.

BACKGROUND OF THE APPLICATION

A battle game is a game in which a plurality of user accounts compete in the same scene. For example, the battle game may be a multiplayer online battle arena (MOBA) game. A player may control a virtual object to cast an ability in a MOBA game, thereby attacking an opponent virtual object.

In the related technology, during ability casting, a virtual prop is cast, thereby hurting an object within a prop function trigger range, and abilities can be leveled up. For example, when a virtual object is upgraded from a first level to a second level, a player can select an ability of the virtual object to be leveled up, thereby raising an attribute value of the ability, so as to improve an attack effect of the ability.

However, the foregoing mechanism of upgrading abilities for a virtual object provides relatively low freedom for user to customize its virtual object, hence less variation of operation can be performed.

SUMMARY

Embodiments of this application provide a method and an apparatus for selecting an ability of a virtual object, a device, a medium, and a program product, to improve diversity of ability combinations in a virtual battle. The technical solutions are as follows:

An aspect provides a method for selecting an ability of a virtual object, applicable to a computer device, the method including:

displaying a first ability identifier of a first ability, the first ability being an ability configured for the virtual object to perform the first ability at a first level in a virtual battle;

displaying at least two second ability identifiers of second abilities associated with the virtual object in response to the virtual object changing from the first level to a second level in the virtual battle, second abilities corresponding to the second ability identifiers being corresponding to the second level, and the at least two second ability identifiers including a target second ability identifier; and replacing the first ability with a second ability corresponding to the target second ability identifier in response to a selection operation on the target second ability identifier.

Another aspect provides an apparatus for selecting an ability of a virtual object, including:

a display module, configured to display a first ability identifier of a first ability, the first ability being an ability configured for the virtual object to perform the first ability at a first level in a virtual battle;

the display module being further configured to display at least two second ability identifiers of at least second abilities associated with the virtual object in response to the virtual object changing from the first level to a second level in the virtual battle, the second abilities corresponding to the second level, and the at least two second ability identifiers comprising a target second ability identifier; and a receiving module, configured to replace the first ability with a second ability corresponding to the target second ability identifier in response to a selection operation on the target second ability identifier.

Another aspect provides a computer device, including a processor and a memory, the memory storing at least one instruction, the at least one instruction being loaded and executed by the processor and causing the computer device to implement the method for selecting an ability of a virtual object provided in the foregoing embodiments.

Another aspect provides a non-transitory computer-readable storage medium, storing at least one instruction, the at least one instruction being loaded and executed by a processor of a computer device and causing the computer device to implement the method for selecting an ability of a virtual object provided in the foregoing embodiments.

According to another aspect, a computer program product or a computer program is provided, the computer program product or the computer program including computer instructions, the computer instructions being stored in a non-transitory computer-readable storage medium. A processor of a computer device reads the computer instructions from the computer-readable storage medium and executes the computer instructions to cause the computer device to perform the method for selecting an ability of a virtual object described in any one of the foregoing embodiments.

The technical solutions provided in the embodiments of this application achieve at least the following beneficial effects:

At least two second ability identifiers are displayed when a virtual object is changed to a second level, and a selected second ability replaces a first ability to serve as an evolved ability of the virtual object. Because the second ability is selected from at least two candidate second abilities, diversity of ability evolution is increased, and strategization of a virtual battle is improved, to avoid a problem that relatively weak strategization of the virtual battle is caused because of relatively undiversified ability configuration, thereby improving experience of a player in the virtual battle.

BRIEF DESCRIPTION OF THE DRAWINGS

To describe the technical solutions in the embodiments of this application more clearly, the accompanying drawings required for describing the embodiments are briefly described below. Apparently, the accompanying drawings in the following descriptions show merely some embodiments of this application, and a person of ordinary skill in the art may obtain other accompanying drawings according to these accompanying drawings without creative efforts.

FIG. 1 is a schematic diagram of an interface of an ability trigger process according to an exemplary embodiment of this application.

DESCRIPTION OF EMBODIMENTS

Figure 1:
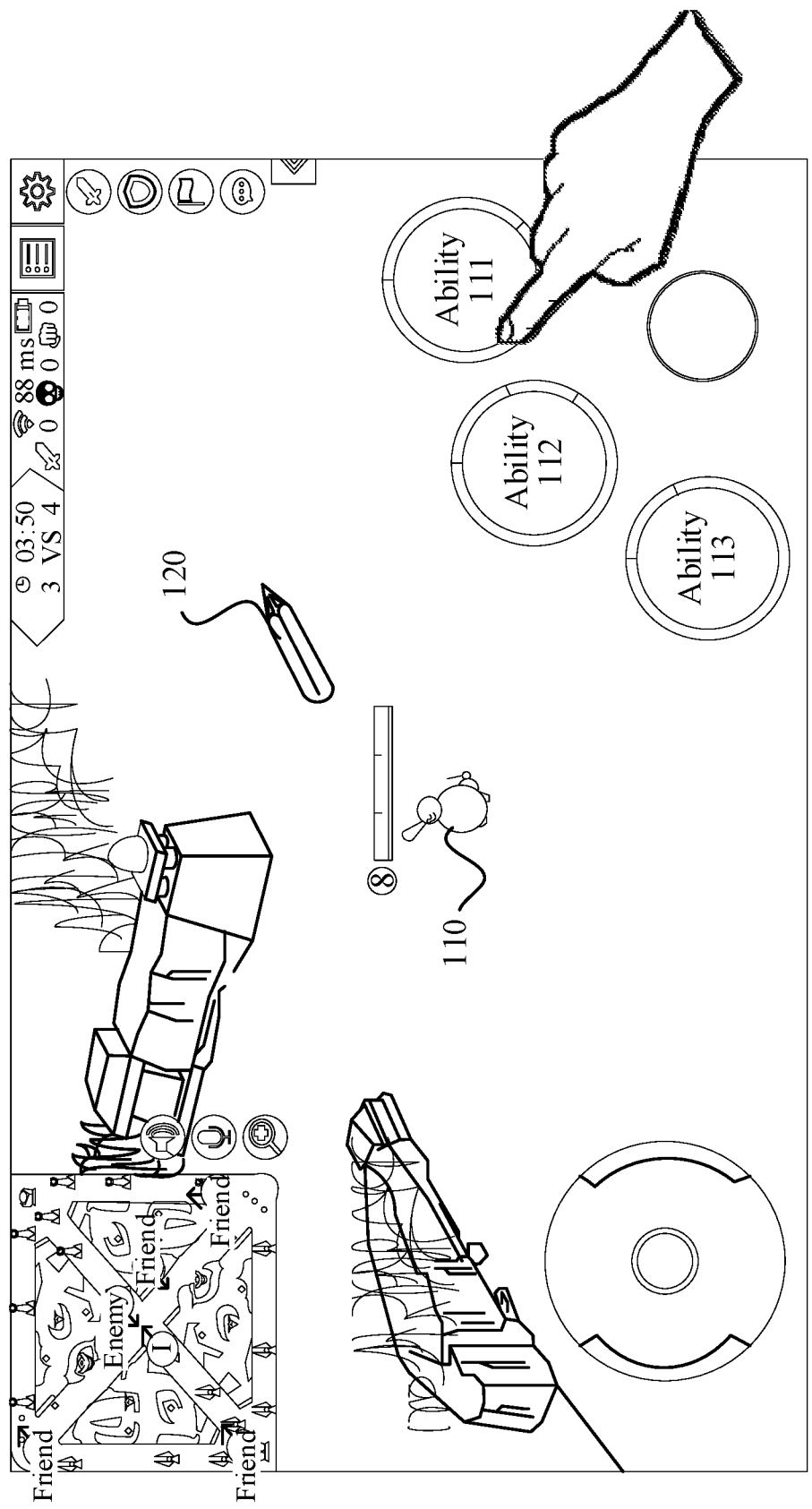

To make objectives, technical solutions, and advantages of this application clearer, the following further describes implementations of this application in detail with reference to the accompanying drawings.

First, terms involved in the embodiments of this application are briefly introduced.

A virtual environment is a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this application.

A virtual object is a movable object in a virtual environment. The movable object may be a virtual character, a virtual animal, a cartoon character, or the like, such as a character, an animal, or the like displayed in a three-dimensional virtual environment. In some embodiments, the virtual object is a three-dimensional model created based on a skeletal animation technology. Each virtual role has a respective shape and size in the three-dimensional virtual environment, and occupies some space in the three-dimensional virtual environment. The embodiments of this application are described by using an example in which a virtual object is a master virtual object controlled by a user, and the master virtual object generally refers to one or more master virtual objects in a virtual environment.

Multiplayer Online Battle Arena Games (MOBA) is an arena in which different virtual teams on at least two opposing camps occupy respective map regions in a virtual environment, and compete against each other using a specific victory condition as a goal. The victory condition includes, but is not limited to at least one of the following: occupying forts or destroying forts of the opposing camps, killing virtual roles in the opposing camps, ensuring own survivals in a specified scene and time, seizing a specific resource, or outscoring the opponent within a specified time. The battle arena game may take place in rounds. The same map or different maps may be used in different rounds of the battle arena game. Each virtual team includes one or more virtual roles, for example, 1 virtual role, 2 virtual roles, 3 virtual roles, or 5 virtual roles. A duration of a round of the MOBA game is from a time point at which the game starts to a time point at which the victory condition is met.

An ability refers to a capability configured for a virtual object in a virtual battle and used for hurting an opponent virtual object. Usually, a virtual object is simultaneously configured with at least two abilities at a moment in a virtual battle. For example, at a beginning stage of the virtual battle, the virtual object is configured with two initial abilities, and after the virtual object reaches a specific level or conforms to a specific requirement, the virtual object is configured with three abilities. An ability configured for the virtual object can be evolved into a higher form.

For example, referring to FIG. 1, a virtual environment interface 100 includes a master virtual role 110, and the current master virtual role 110 is configured with three abilities in a virtual battle, which are respectively an ability 111, an ability 112, and an ability 113. When a player triggers the ability 111, a virtual object casts a flying prop 120 in a virtual environment to serve as an ability effect, and the flying prop 120 can hurt an opponent virtual object within a range of the ability effect.

Figure 2:
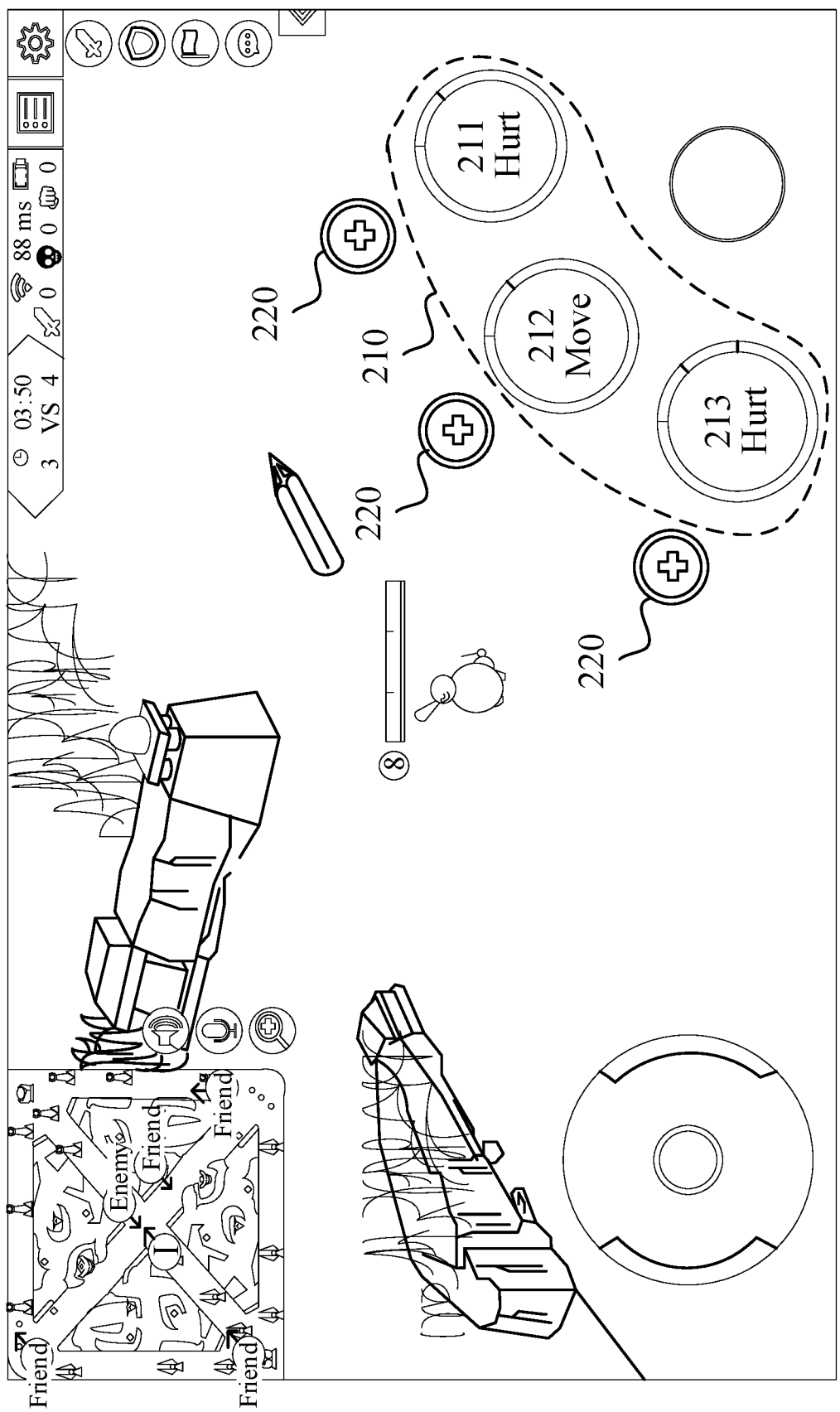
FIG. 2 is a schematic diagram of an interface of performing ability evolution in the related art.

In the related technology, abilities configured for a virtual object in a virtual battle do not change, but are correspondingly evolved according to level upgrading of the virtual object. For example, FIG. 2 is a schematic diagram of an interface of performing ability evolution in the related art. As shown in FIG. 2, a virtual battle interface 200 displays abilities 210 configured for a virtual object, which include an ability 211 (hurt), an ability 212 (move), and an ability 213 (hurt). The level of the current virtual object is upgraded from a fourth level to a fifth level with increase in a value of the level in a virtual battle, and therefore upgrading controls 220 are displayed in upper left corners of the ability 211 (hurt), the ability 212 (move), and the ability 213 (hurt), and are configured to instruct to select and upgrade at least one ability from the three abilities 210. As shown in FIG. 2, currently, if the ability 211 is at a first level, the ability 212 is at a first level, and the ability 213 is at a second level, when a player selects an upgrading control 220 corresponding to the ability 212 (move), the ability 212 is upgraded to a second level. When the ability 212 (move) is upgraded from the first level to the second level, an upgrading effect corresponding thereto is increase in an attribute value of the ability. For example, the ability 212 (move) corresponds to a moving distance of 3 meters at the first level, and corresponds to a moving distance of 3.5 meters at the second level.

However, in the foregoing manner, only the levels of the abilities can be evolved, while the abilities themselves configured for the virtual object in the virtual battle are fixed, and cannot be combined again, causing relatively low diversity of ability configuration.

However, in the embodiments of this application, in response to changing a virtual object to a second level in a virtual battle, a capability of upgrading a first ability configured for the virtual object to a second ability is provided, and at least two candidate second abilities are provided when the first ability is evolved, so that a player can select one second ability from the at least two candidate second abilities to replace the currently configured first ability to serve as a new ability configured for the virtual object.

Figure 3:
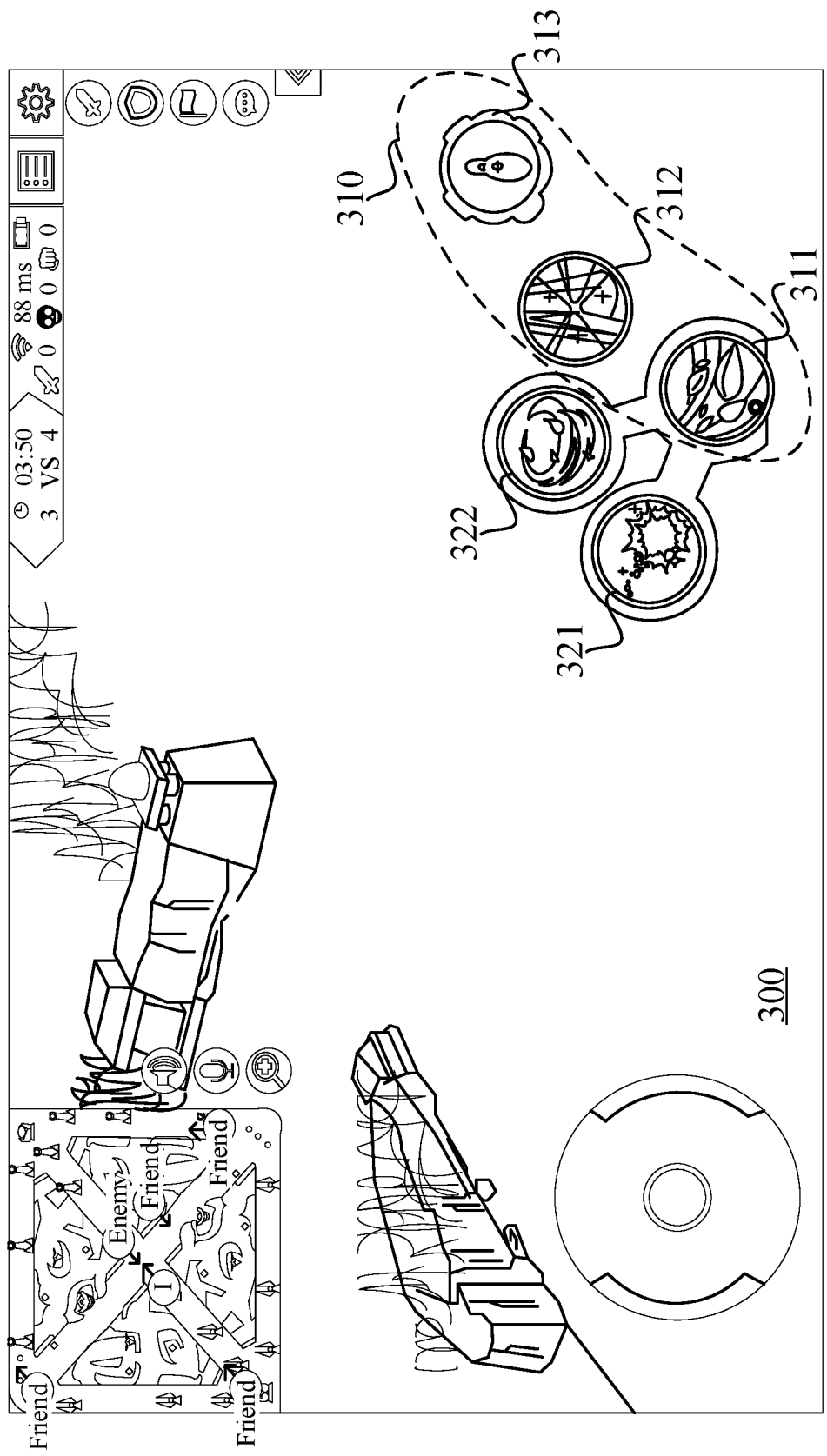
FIG. 3 is a schematic diagram of an interface of ability evolution according to an exemplary embodiment of this application.

For example, FIG. 3 is a schematic diagram of an interface of ability evolution according to an exemplary embodiment of this application. As shown in FIG. 3, an ability 310 configured for a virtual object in a virtual battle is displayed in a virtual battle interface 300, and includes an ability 311 (leaf) and an ability 312 (photosynthesis) that are unlocked, and an ability key position 313 has not been unlocked. When the virtual object is changed to a second level in the virtual battle, the player is prompted in the virtual battle interface 300 that the ability 311 and the ability 312 can be evolved. For example, highlighted blinking display is performed around peripheries of identifiers of the ability 311 and the ability 312. The player can select and evolve at least one ability from the ability 311 and the ability 312. For example, when the player selects and evolves the ability 311, an ability 321 (pollen puff) and an ability 322 (leaf tornado) are displayed in preset positions on a peripheral side of the ability 311, and the ability 321 and the ability 322 are evolved abilities of the ability 311 that the player can select and replace. For example, when the player selects the ability 321 (pollen puff), the ability 321 replacing the ability 311 originally configured for the virtual object is used as an ability evolution result of the virtual object.

Figure 4:
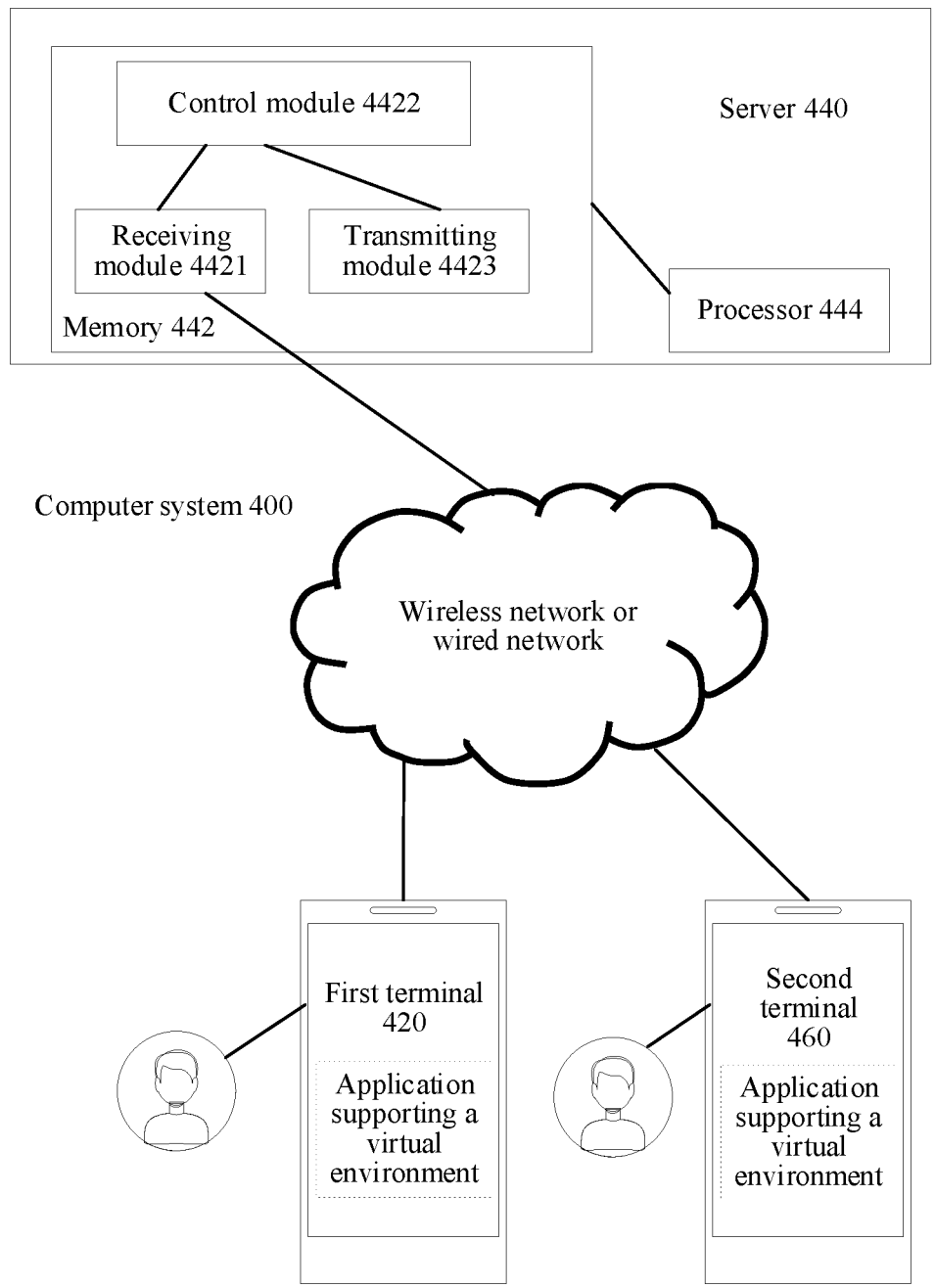
FIG. 4 is a structural block diagram of a computer system according to an exemplary embodiment of this application.

FIG. 4 is a structural block diagram of a computer system according to an exemplary embodiment of this application. The computer system 400 includes a first terminal 420, a server 440, and a second terminal 460.

An application supporting a virtual environment is installed and run on the first terminal 420. The application may be any one of a virtual reality application, a three-dimensional map program, a military simulation program, a First Person Shooting Game (FPS) game, a MOBA game, a multiplayer shooting survival game, and a battle royale shooting game. The first terminal 420 is a terminal used by the first user, and the first user uses the first terminal 420 to control a first master virtual role located in the virtual environment to perform activities, including but not limited to: at least one of adjusting body posture, walking, running, jumping, releasing abilities, picking-up, attacking, or dodging attacks from other virtual roles. For example, the first master virtual role is a first virtual character, for example, a simulated character role or a cartoon character role. For example, the first master virtual role casts a regional ability in the virtual environment, and the virtual environment picture moves from a location at which the master virtual role is located to a target region selected by a regional ability indicator. The regional ability indicator is configured to select a cast region when the master virtual role casts an ability.

The first terminal 420 is connected to the server 440 by a wireless network or a wired network.

The server 440 includes at least one of one server, a plurality of servers, a cloud computing platform, and a virtualization center. For example, the server 440 includes a processor 444 and a memory 442. The memory 442 further includes a receiving module 4421, a control module 4422, and a transmitting module 4423. The receiving module 4421 is configured to receive a request transmitted by a client, such as a team forming request; the control module 4422 is configured to control rendering of the virtual environment picture; and The transmission module 4423 is configured to send a message notification to the client, such as a team success notification. The server 440 is configured to provide a backend service for an application supporting a three-dimensional virtual environment. In some embodiments, the server 440 is responsible for primary computing work, and the first terminal 420 and the second terminal 460 are responsible for secondary computing work; or the server 440 is responsible for secondary computing work, and the first terminal 420 and the second terminal 460 are responsible for primary computing work; or the server 440, the first terminal 420, and the second terminal 460 perform collaborative computing by using a distributed computing architecture among each other.

The second terminal 460 is connected to the server 440 by a wireless network or a wired network.

An application supporting a virtual environment is installed and run on the second terminal 460. The second terminal 460 is a terminal used by a second user, and the second user uses the second terminal 460 to control a second master virtual role located in the virtual environment to perform a movement. For example, the second master virtual role is a second virtual character, for example, a simulated character role or a cartoon character role.

In some embodiments, the first virtual character role and the second virtual character role are located in the same virtual environment. In some embodiments, the first virtual character role and the second virtual character role may belong to the same team or the same organization, have a friend relationship, or have a temporary communication permission.

In some embodiments, the applications installed on the first terminal 420 and the second terminal 460 are the same, or the applications installed on the two terminals are the same type of applications in different control system platforms. The first terminal 420 may be generally one of a plurality of terminals, and the second terminal 460 may be generally one of a plurality of terminals. In this embodiment, only the first terminal 420 and the second terminal 460 are used as an example for description. The device types of the first terminal 420 and the second terminal 460 are the same or different. The following embodiment is described by using an example in which the terminal includes a smartphone.

A person skilled in the art may learn that there may be more or fewer terminals. For example, there may be only one terminal, or there are dozens of, hundreds of, or more terminals. The number and the device type of the terminal are not limited in the embodiments of this application.

Figure 5:
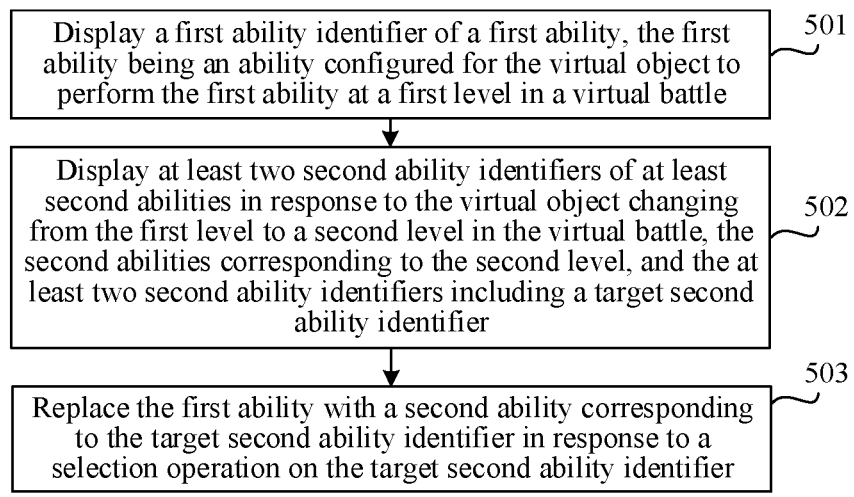
FIG. 5 is a flowchart of a method for selecting an ability of a virtual object according to an exemplary embodiment of this application.

FIG. 5 is a flowchart of a method for selecting an ability of a virtual object according to an exemplary embodiment of this application. The method is applicable to a computer device. The computer device may be implemented as the first terminal 420 or the second terminal 460 shown in FIG. 4, or another terminal in the computer system 400. The method includes:

Step 501. Display a first ability identifier of a first ability, the first ability being an ability configured for the virtual object to perform the first ability at a first level in a virtual battle.

The first ability corresponds to the first level, that is, the first ability is an ability configured by the computer device for the virtual object when the virtual object is at the first level. In some embodiments, a single ability corresponds to a single level, or a single ability corresponds to a plurality of levels. When a single ability corresponds to a plurality of levels, ability effects of an ability at different levels are the same or different. For example, when the virtual object is at each of the first level and the second level, the player can select the ability "leaf". When the virtual object is at the first level, the leaf ability is at the first stage of evolution, and when the virtual object is at the second level, the leaf ability is at the second stage of evolution. When the virtual object is switched to the second level, at least two abilities are provided for the player to select, and include the leaf ability at the second stage of evolution. That is, when the virtual object is switched from the first level to the second level, the player may select to evolve the leaf ability at the first stage into the leaf ability at the second stage, or may select to evolve the leaf ability at the first stage into another ability different from the leaf ability.

In this embodiment of this application, a description is made by using an example in which abilities provided at different levels are different. Abilities provided at an $n^{th}$ level are preset. For example, at the first level, abilities provided for the player to select are obtained from a first ability set, and at the second level, abilities provided for the player to select are obtained from a second ability set, where both the first ability set and the second ability set are preset ability sets; or abilities provided at the $n^{th}$ level are associated with abilities selected by the player at an $(n-1)^{th}$ level, and n is a positive integer greater than 1. For example, when an ability selected by the player at the first level is the leaf ability, abilities provided for the player to select at the second level are the pollen puff ability and the leaf tornado ability, and the pollen puff ability and the leaf tornado ability are associated with the leaf ability.

In some embodiments, the first ability identifier is implemented as at least one of an icon of the first ability, a name of the first ability, and an attribute of the first ability. That is, if the first ability identifier is displayed in a battle interface of the virtual battle, it indicates that the virtual object is currently configured with the first ability. In some embodiments, the first ability identifier is used for indicating an ability configuration situation of the virtual object, and/or the first ability identifier is used for controlling the virtual object to cast an ability. For example, when the player selects the first ability identifier, the virtual object is triggered to cast the first ability in the virtual battle.

In some embodiments, the first ability is an initial equipped ability of the virtual object participating in the virtual battle, or the first ability is an ability configured by the player for the virtual object during historical level switching of the virtual object. When the first ability is the initial equipped ability of the virtual object, the first ability is a preset ability, or the first ability is an ability randomly selecting from an initial ability set.

In some embodiments, a virtual battle interface is displayed, and the virtual battle interface is an interface of observing a virtual environment when the virtual object participates in the virtual battle. In some embodiments, the virtual battle interface includes a virtual environment picture and a control (for example, the foregoing first ability identifier), where the control is superimposed and displayed on a virtual environment interface.

Step 502. Display at least two second ability identifiers of at least second abilities associated with the virtual object in response to the virtual object changing from the first level to a second level in the virtual battle, the second abilities corresponding to the second level, and the at least two second ability identifiers including a target second ability identifier.

In some embodiments, the second level is a particular level at which an ability evolution event exists, or the second level is a level within a preset level range at which an evolution event can be provided. For example, the highest level of the virtual object is the level 50, and when the virtual object is at a level lower than the level 30, the virtual object correspondingly has one ability evolution opportunity each time the virtual object is raised by one level. In some embodiments, the first level is the level 5, and the second level is the level 10. That is, the virtual object is upgraded level by level starting from the level 5, and when the virtual object is upgraded to the level 10, at least two second ability identifiers are displayed in a preset display position corresponding to the first ability identifier.

In the foregoing example, a description is made by using an example in which levels are implemented as digital levels. In some embodiments, levels of the virtual object may alternatively be implemented as preset names, and this is not limited in this embodiment of this application.

In some embodiments, as the level of the virtual object changes, the appearance form of the virtual object correspondingly changes with the level. For example, if the virtual object is implemented as a virtual elf, the virtual elf is evolved with the battle process in the virtual battle, and changes in the appearance form with the evolution.

The at least two second ability identifiers are used for providing at least two second abilities to the virtual object to replace the first ability, and the second abilities correspond to the second level of the virtual object after evolution. For example, the virtual object is currently in a primary form and configured with the leaf ability, and when the virtual object is evolved into an intermediate form, the pollen puff ability and the leaf tornado ability are displayed, where the pollen puff ability and the leaf tornado ability are abilities corresponding to the second level. In addition, in some embodiments, the pollen puff ability and the leaf tornado ability corresponds to the second level, and the pollen puff ability and the leaf tornado ability correspond to the leaf ability. That is, the leaf ability is an ability corresponding to a current key position in the primary form, and the pollen puff ability and the leaf tornado ability are abilities corresponding to the current key position in the intermediate form.

In some embodiments, the at least two second ability identifiers displayed in the interface are identifiers corresponding to at least two preset second abilities; or the at least two second ability identifiers displayed in the interface are identifiers corresponding to at least two second abilities selected from a preset ability library corresponding to the second level.

In some embodiments, the at least two second ability identifiers are displayed in a preset display position corresponding to the first ability identifier. In some embodiments, the foregoing preset display position includes a position corresponding to the display key position of the first ability in the virtual environment interface, or the foregoing preset display position is a position corresponding to the first ability identifier in an ability configuration interface, the foregoing ability configuration interface is an interface retrieved through a preset control, and the player may configure the current ability in the ability configuration interface.

In some embodiments, a manner of displaying the at least two second ability identifiers includes any one of the following manners:

A first manner is to display the at least two second ability identifiers in a sector display manner with the first ability identifier as a surrounding center.

A second manner is to display at least two switching paths with the first ability identifier as a path start point, where end points of the switching paths are the at least two second ability identifiers.

Figure 6:
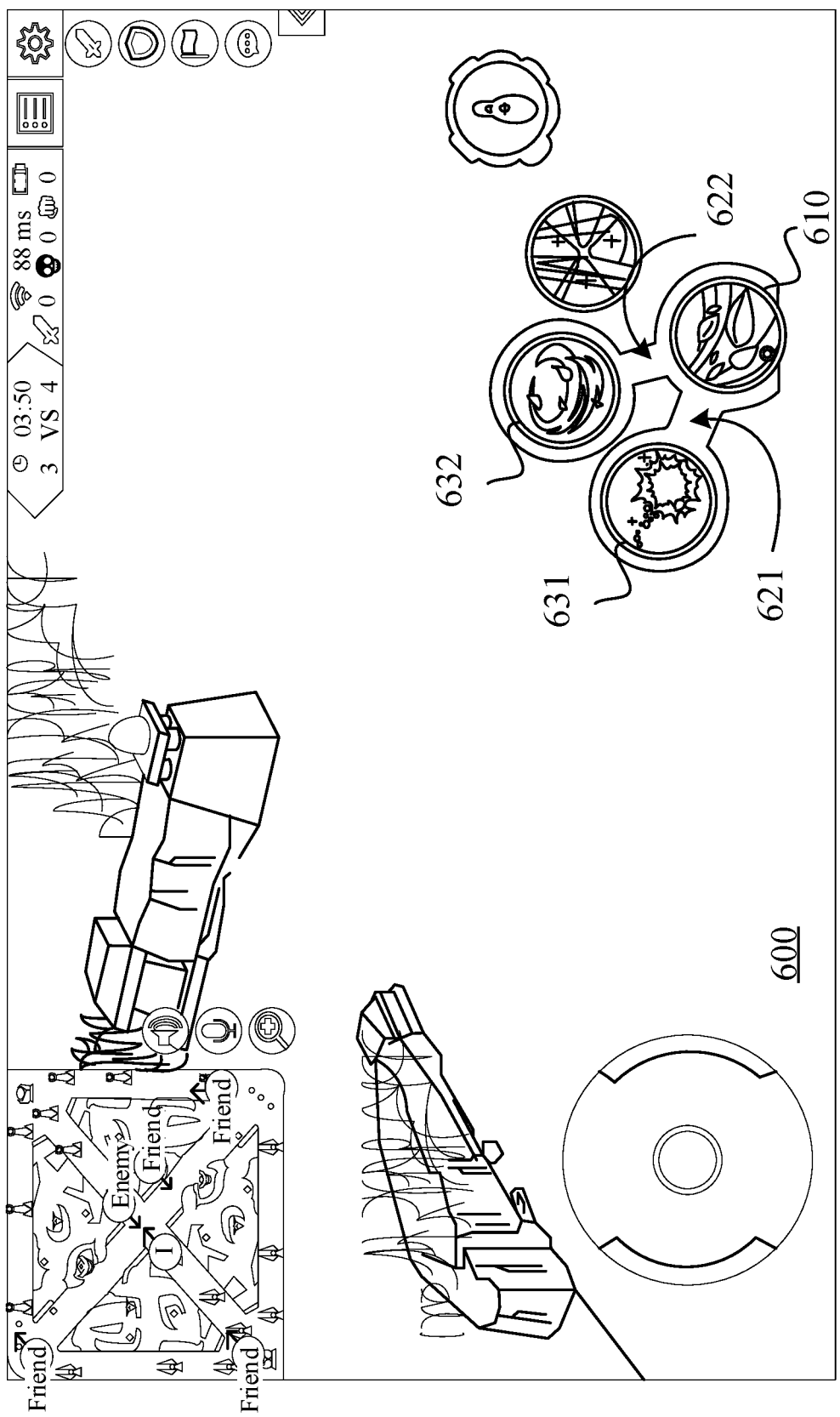
FIG. 6 is a schematic diagram of displaying second ability identifiers in the form of switching paths according to the embodiment shown in FIG. 5.

For example, a description is made by using an example in which the second ability identifiers are displayed in the form of switching paths. FIG. 6 is a schematic diagram of displaying at least two second ability identifiers in an interface according to an exemplary embodiment of this application. As shown in FIG. 6, a first ability identifier 610 is displayed in a virtual battle interface 600, a current first ability is a to-be-evolved ability, a switching path 621 and a switching path 622 are displayed corresponding to the first ability identifier 610, a path end point of the switching path 621 is a second ability identifier 631, and a path end point of the switching path 622 is a second ability identifier 632.

A third manner is to superimpose and display the at least two second ability identifiers in a display position of the first ability identifier. Each second ability identifier displays a scaled-down complete ability identifier, or each second ability identifier displays a tailored partial identifier. For example, if a description is made by using two second ability identifiers as an example, when the two ability identifiers are displayed, a left half identifier of one of the second ability identifiers is obtained through tailoring, a right half identifier of the other second ability identifier is obtained through tailoring, and after the left half identifier and the right half identifier obtained through tailoring are spliced, an identifier obtained through splicing is superimposed and displayed on the first ability identifier. The size of the identifier obtained by splicing the left half identifier and the right half identifier obtained through tailoring is consistent with the size of the first ability identifier; or the size of the identifier obtained by splicing the left half identifier and the right half identifier obtained through tailoring is greater than the identifier size of the first ability identifier.

In some embodiments, the second abilities include at least one type of ability of the following three types:

(1). The second abilities are abilities the same as the first ability. In some embodiments, the second abilities are abilities obtained after the ability level of the first ability is raised, that is, ability levels of the first ability and the second abilities are different, and the raise in the ability level causes attribute values corresponding to the second abilities to be raised, but the ability effects of the second abilities are the same as that of the first ability. For example, the ability effect of the first ability is an accelerating effect, whose corresponding accelerating attribute value is speed raise of 4%, and the ability effects of the second abilities are also an accelerating effect, whose corresponding accelerating attribute value is speed raise of 6%.

In some embodiments, the foregoing ability effects include at least one of an ability name, a display effect of an ability cast in a virtual environment, an attribute effect, an ability configuration structure, and the like.

An ability configuration structure is used for indicating an effect combination situation generated by an ability, and if ability configuration structures of different second abilities are different, it indicates that the different second abilities can generate different effects. In some embodiments, the ability configuration structure of the second ability includes at least one of configuration information such as attribute, function, rarity, attack performance, defense performance, subsidiarity, and the like corresponding to the second ability. For example, using an example in which the ability configuration structure includes the function of the ability, the at least two second abilities are respectively the pollen puff ability and the leaf tornado ability, where the ability configuration structure of the pollen puff ability is hurt and restoration, that is, the pollen puff ability can both supplement hurt for a teammate and provide health point restoration for the teammate; and the ability configuration structure of the leaf tornado ability is hurt and accelerating, that is, and can both hurt an opponent and provide an accelerating runway to increase the moving speed.

(2). The second abilities are abilities partially the same as the first ability. In some embodiments, the ability effect of the first ability is partially the same as those of the second abilities, the second abilities are abilities obtained after the first ability undergoes ability evolution, and the ability evolution changes some ability effects of the ability. In some embodiments, attribute values corresponding to the ability effects of the second abilities partially the same as that of the first ability may be raised, or may be kept the same as that of the first ability. For example, the ability effect of the first ability is the accelerating effect, whose corresponding accelerating attribute value is speed raise of 4%, and the ability effects of the second abilities include the accelerating effect and the restoration effect, where the restoration effect is to restore a virtual state of the virtual object, for example, a health point, an energy point, or a mana point, and the accelerating attribute value corresponding to the foregoing accelerating effect may be the same as that of the first ability, that is, is still speed raise of 4%, or may be different from that of the first ability, for example, speed raise of 6%. Alternatively, the ability effects of the first ability are the accelerating effect and the restoration effect, where if the accelerating attribute value corresponding to the accelerating effect is speed raise of 4%, and the restoration attribute value corresponding to the restoration effect is health point restoration of 100 points, an ability effect of a second ability A is the accelerating effect, whose corresponding accelerating attribute value is speed raise of 10%, and an ability effect of a second ability B is the restoration effect, whose corresponding restoration attribute value is health point restoration of 500 points.

(3). The second abilities are abilities completely different from the first ability. In some embodiments, the ability effect of the first ability is completely different from those of the second abilities, the second abilities are abilities obtained after the first ability undergoes ability evolution, and the ability evolution changes all ability effects of the ability. For example, the second ability is not an advanced ability obtained after the attribute value is increased based on the first ability, but another ability that is set different from the first ability in both the presentation form and the attribute value. For example, the ability effect of the first ability is the accelerating effect, whose corresponding accelerating attribute value is speed raise of 4%, and the ability effects of the second abilities are a transfer effect, whose corresponding transfer attribute value is a transfer range of 100 meters.

In some embodiments, corresponding ability configuration structures of at least two second abilities corresponding to the foregoing at least two second ability identifiers are different.

Step 503. Replace the first ability with a second ability corresponding to the target second ability identifier in response to a selection operation on the target second ability identifier.

In this embodiment of this application, the foregoing at least two second ability identifiers include the target second ability identifier, and the target second ability identifier is a second ability identifier selected by the player to replace the first ability identifier.

In some embodiments, the selection operation is implemented through touch on the interface, or the selection operation is implemented through a physical key. For example, a click operation on the second ability identifier on the virtual battle interface is received, and the click operation is used as the selection operation on the target second ability identifier. The foregoing selection operation may be further implemented by a long-press operation, a double-click operation (including at least one of a single-finger double-click operation or a two-or-more-finger double-click operation), a hover operation, a drag operation, and a combination thereof, which is not limited herein.

In some embodiments, the first ability identifier is displayed in a target display key position in the virtual environment interface, and after the selection operation on the target second ability identifier is received, display of the first ability identifier in the target display key position is canceled according to the selection operation, and the target second ability identifier is displayed in the target display key position. When the target second ability identifier is displayed in the foregoing target display key position, it indicates that the first ability configured for the virtual object is replaced with the second ability corresponding to the target second ability identifier.

In conclusion, in the method for selecting an ability of a virtual object provided in this embodiment of this application, at least two second ability identifiers are displayed when a virtual object is changed to a second level, and a selected second ability replaces a first ability to serve as an evolved ability of the virtual object. Because the second ability is selected from at least two candidate second abilities, diversity of ability evolution is increased, and strategization of a virtual battle is improved, to avoid a problem that relatively weak strategization of the virtual battle is caused because of relatively undiversified ability configuration, thereby improving experience of a player in the virtual battle.

Figure 7:
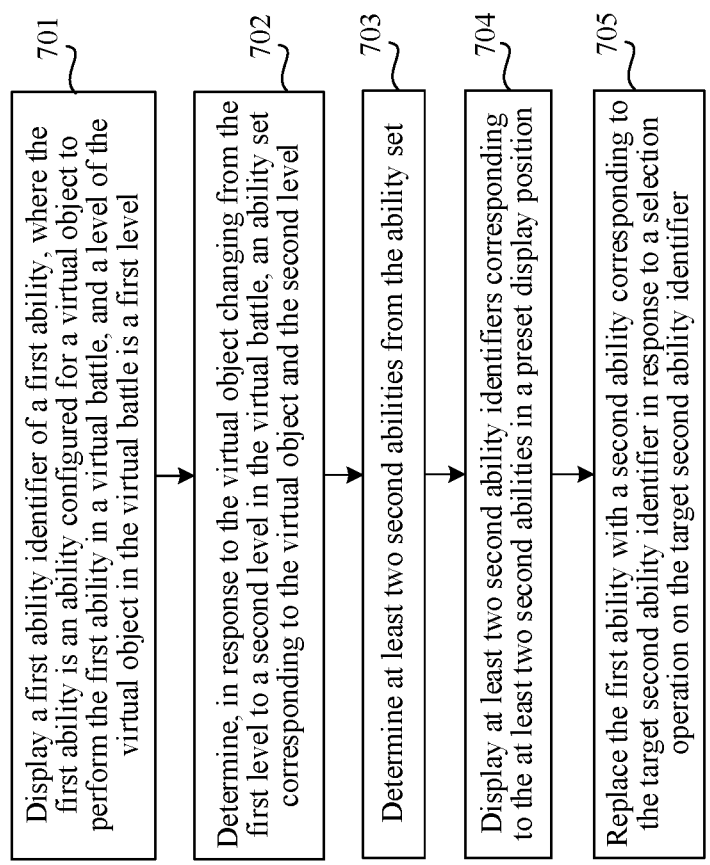
FIG. 7 is a flowchart of a method for selecting an ability of a virtual object according to another exemplary embodiment of this application.

In some embodiments, the at least two second abilities are determined from the ability set corresponding to its own role of the virtual object and the second level. FIG. 7 is a flowchart of a method for selecting an ability of a virtual object according to another exemplary embodiment of this application. An example in which the method is applied to a terminal is used for description. As shown in FIG. 7, the method includes:

Step 701. Display a first ability identifier of a first ability, where the first ability is an ability configured for a virtual object to perform the first ability in a virtual battle, and a level of the virtual object in the virtual battle is a first level.

The first ability corresponds to the first level, that is, the first ability is an ability configured for the virtual object when the virtual object is at the first level. In some embodiments, a single ability corresponds to a single level, or a single ability corresponds to a plurality of levels. When a single ability corresponds to a plurality of levels, ability effects of an ability at different levels are the same or different. For example, when the virtual object is at each of the first level and the second level, the player can select the ability "leaf". When the virtual object is at the first level, the leaf ability is at the first stage of evolution, and when the virtual object is at the second level, the leaf ability is at the second stage of evolution. When the virtual object is switched to the second level, at least two abilities are provided for the player to select, and include the leaf ability at the second stage of evolution.

In some embodiments, the first ability identifier is implemented as at least one of an icon of the first ability, a name of the first ability, and an attribute of the first ability. That is, if the first ability identifier is displayed in a battle interface of the virtual battle, it indicates that the virtual object is currently configured with the first ability. In some embodiments, the first ability identifier is used for indicating an ability configuration situation of the virtual object, and/or the first ability identifier is used for controlling the virtual object to cast an ability. For example, when the player selects the first ability identifier, the virtual object is triggered to cast the first ability in the virtual battle.

Step 702. Determine, in response to the virtual object changing from the first level to a second level in the virtual battle, an ability set corresponding to the virtual object and the second level.

The ability set corresponds to its own role of the virtual object, and the ability set corresponds to the foregoing second level, that is, its own role of the virtual object corresponds to an entire ability set, and the ability set corresponding to the second level is a subset in the entire ability set.

In some embodiments, the virtual object corresponds to a role identifier, the second level corresponds to a level identifier, and an ability set corresponding to both the role identifier and the level identifier is searched for and used as an ability set from which the second abilities are selected.

Step 703. Determine at least two second abilities from the ability set.

In some embodiments, a manner of determining the at least two second abilities from the ability set includes any one of the following manners:

A first manner is to randomly determine the at least two second abilities from the ability set. For example, the quantity of second abilities provided for the player to select is preset, and the at least two second abilities are randomly determined from the ability set according to the foregoing quantity.

A second manner is to obtain historical behavior data corresponding to the virtual object, where the historical behavior data includes historical ability trigger data of the virtual object; and determine the at least two second abilities triggered for the most number of times from the ability set according to the historical behavior data. In some embodiments, the historical behavior data further includes historical ability selection data of the virtual object, that is, the number of times that the player selects an ability in a historical virtual battle.

A third manner is to determine, from the ability set according to settings of the player, the at least two second abilities selected by the player. For example, before the virtual battle begins, the player presets to-be-provided second abilities in an ability setting interface.

A fourth manner is to determine, from the ability set according to an equipment attribute of a virtual equipment configured for the virtual object in the current virtual battle, the at least two second abilities selected by the player. In an example, when the equipment attribute is a physical attribute, the at least two second abilities matching the physical attribute are selected from the ability set, and when the equipment attribute is a magic attribute, the at least two second abilities matching the magic attribute are selected from the ability set.

Step 704. Display at least two second ability identifiers corresponding to the at least two second abilities in a preset display position.

In this embodiment of this application, the foregoing preset display position corresponds to the first ability identifier. In some embodiments, the preset display position may be a position within a preset sector range with the first ability identifier as a surrounding center; or the preset display position may be a position at a preset distance to the first ability identifier with the first ability identifier as a start point; the preset display position may be a display position of the first ability identifier, which is not limited herein.

Figure 8:
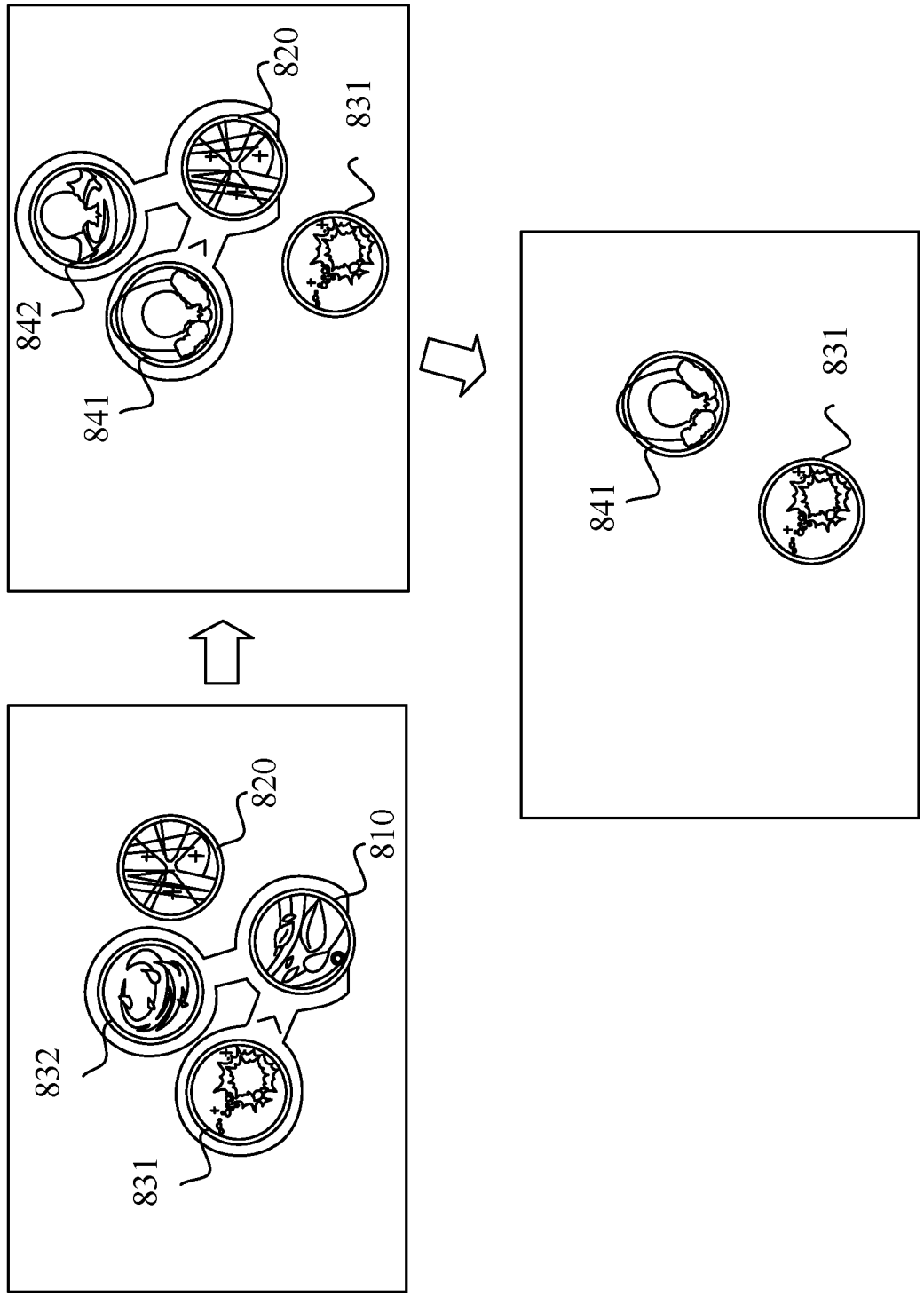
FIG. 8 is a schematic diagram of ability combination situations according to the embodiment shown in FIG. 7.

In some embodiments, if the virtual object itself is configured with at least two first abilities, the virtual battle interface displays at least two first ability identifiers, and the player can respectively evolve the at least two first abilities in different evolution stages. For example, referring to FIG. 8, a virtual battle interface includes two first abilities, which are respectively a leaf ability 810 and a photosynthesis ability 820. When a virtual object is evolved from a primary form into an intermediate form, a player selects the leaf ability 810 from the leaf ability 810 and the photosynthesis ability 820 to perform evolution, and during evolution of the leaf ability 810, two candidate second abilities are included, and are respectively a pollen puff ability 831 and a leaf tornado ability 832. In an exemplary embodiment, the player selects the pollen puff ability 831, so that the virtual object is configured with the pollen puff ability 831 and the photosynthesis ability 820.

When the virtual object is evolved from the intermediate form into an advanced form, the player selects the photosynthesis ability 820 from the pollen puff ability 831 and the photosynthesis ability 820 to perform evolution, and during evolution of the photosynthesis ability 820, two candidate second abilities are included, and are respectively a cotton guard ability 841 and a cotton spore ability 842. In an exemplary embodiment, the player selects the cotton guard ability 841, so that the virtual object is configured with the pollen puff ability 831 and the cotton guard ability 841.

For the foregoing different selection situations, when the virtual object is evolved into the advanced form, possible ability configuration manners include:

1, the pollen puff ability 831 and the cotton guard ability 841;
2, the pollen puff ability 831 and the cotton spore ability 842;
3, the leaf tornado ability 832 and the cotton guard ability 841; and
4, the leaf tornado ability 832 and the cotton spore ability 842.

In some embodiments, when the virtual object is evolved from the intermediate form into the advanced form, the player does not evolve the photosynthesis ability 820, but continues to evolve the pollen puff ability 831, that is, there may be more ability configuration manners. This is not limited in this embodiment of this application.

In the foregoing example, a description is made by using an example in which the player selects one ability from two abilities to perform evolution. In some embodiments, after the level of the virtual object is switched, the player can evolve a designated ability, but cannot select one of a plurality of abilities to perform evolution.

Step 705. Replace the first ability with a second ability corresponding to the target second ability identifier in response to a selection operation on the target second ability identifier.

In this embodiment of this application, the at least two second ability identifiers include the target second ability identifier.

In some embodiments, in response to displaying switching paths between the first ability identifier and the second ability identifiers, a slide operation received between the first ability identifier and the target second ability identifier is used as the selection operation, where a slide start position of the slide operation is on the first ability identifier, and a slide termination position of the slide operation is on the target second ability identifier.

In some embodiments, when a second ability is selected, the selected second ability needs to be first understood to specific extent. Therefore, the slide operation between the first ability identifier and the target second ability identifier is received, and an ability effect preview animation of the target second ability identifier is displayed according to the slide operation; and in response to end of the slide operation and the slide termination position of the slide operation being on the target second ability identifier, the slide operation is determined as the selection operation on the target second ability identifier.

Figure 9:
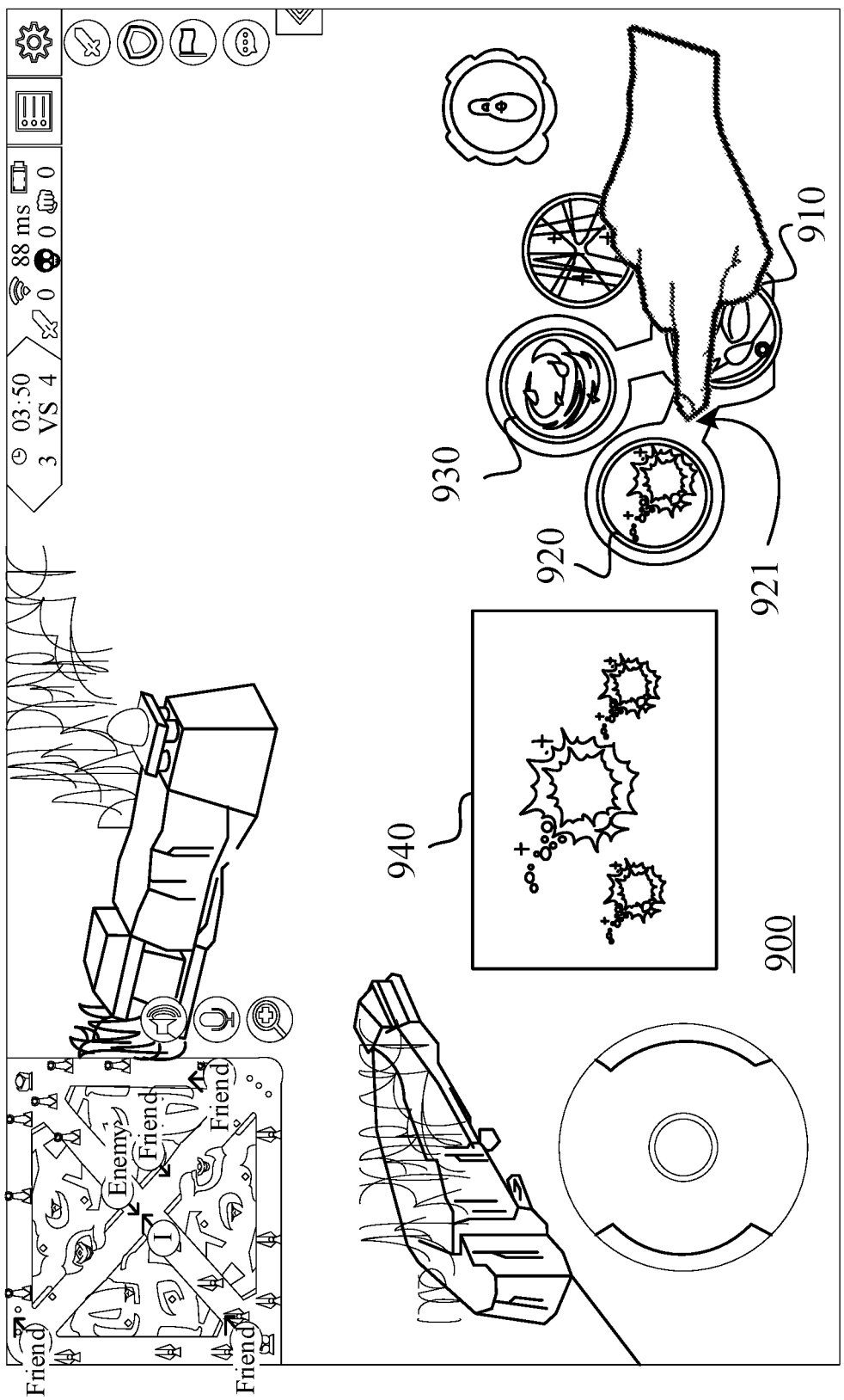
FIG. 9 is a schematic diagram of an interface of a virtual battle according to the embodiment shown in FIG. 7.

For example, FIG. 9 is a schematic diagram of a virtual battle interface according to an exemplary embodiment of this application. As shown in FIG. 9, the virtual battle interface 900 displays a first ability identifier 910, a second ability identifier 920, and a second ability identifier 930, there is a switching path 921 between the first ability identifier 910 and the second ability identifier 920, and when a slide operation on the switching path 921 is received, an ability effect preview animation 940 is displayed on a peripheral side of the second ability identifier 920. In the embodiment shown in FIG. 9, After viewing the ability effect preview animation 940, the player determines that a second ability corresponding to the second ability identifier 920 is an ability that needs to be selected. Therefore, the slide operation is ended on the second ability identifier 920, thereby selecting the second ability.

In some embodiments, display of the first ability identifier is canceled according to the selection operation, and the target second ability identifier is displayed in the target display key position of the first ability identifier.

In conclusion, in the method for selecting an ability of a virtual object provided in this embodiment of this application, at least two second ability identifiers are displayed when a virtual object is changed to a second level, and a selected second ability replaces a first ability to serve as an evolved ability of the virtual object. Because the second ability is selected from at least two candidate second abilities, diversity of ability evolution is increased, and strategization of a virtual battle is improved, to avoid a problem that relatively weak strategization of the virtual battle is caused because of relatively undiversified ability configuration, thereby improving experience of a player in the virtual battle.

In the method provided in this embodiment, the second ability identifiers of the at least two second abilities are determined from the ability set and displayed, thereby improving the selection diversity and the selectable range of the second abilities, and improving the combination capability of ability configuration.

In the method provided in this embodiment, during ability switching, the ability effect preview animation is presented according to the slide operation, thereby presenting ability effects of candidate abilities in advance, for the player to confirm and select the second abilities, to improve the ability selection efficiency.

Figure 10:
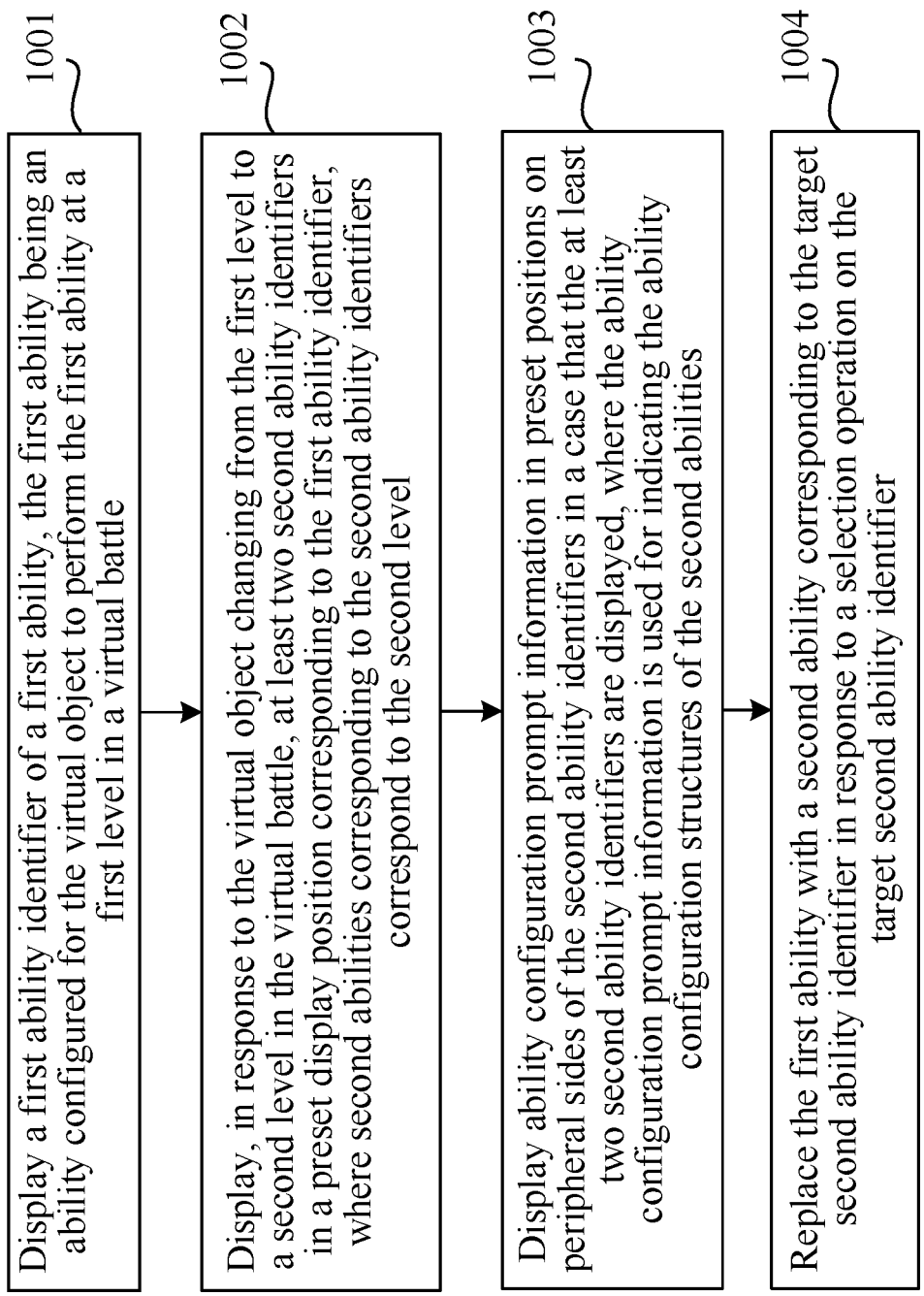
FIG. 10 is a flowchart of a method for selecting an ability of a virtual object according to another exemplary embodiment of this application.

In some embodiments, ability configuration prompt information is further displayed on a peripheral side of the second ability identifier. FIG. 10 is a flowchart of a method for selecting an ability of a virtual object according to another exemplary embodiment of this application. A description is made by using an example in which the method is applied to a terminal. As shown in FIG. 10, the method includes:

Step 1001. Display a first ability identifier of a first ability, the first ability being an ability configured for the virtual object to perform the first ability at a first level in a virtual battle.

In some embodiments, the first ability identifier is implemented as at least one of an icon of the first ability, a name of the first ability, and an attribute of the first ability. That is, if the first ability identifier is displayed in a battle interface of the virtual battle, it indicates that the virtual object is currently configured with the first ability. In some embodiments, the first ability identifier is used for indicating an ability configuration situation of the virtual object, and/or the first ability identifier is used for controlling the virtual object to cast an ability. For example, when the player selects the first ability identifier, the virtual object is triggered to cast the first ability in the virtual battle.

Step 1002. Display, in response to the virtual object changing from the first level to a second level in the virtual battle, at least two second ability identifiers in a preset display position corresponding to the first ability identifier, where second abilities corresponding to the second ability identifiers correspond to the second level.

In some embodiments, as the level of the virtual object changes, the appearance form of the virtual object correspondingly changes with the level. For example, if the virtual object is implemented as a virtual elf, the virtual elf is evolved with the battle process in the virtual battle, and changes in the appearance form with the evolution.

The at least two second ability identifiers are used for providing at least two second abilities to the virtual object to replace the first ability, and the second abilities correspond to the second level of the virtual object after evolution. For example, the virtual object is currently in a primary form, and is configured with a leaf ability, and when the virtual object is evolved into an intermediate form, a pollen puff ability and a leaf tornado ability are displayed in a preset display position corresponding to an ability identifier of the leaf ability, where the pollen puff ability and the leaf tornado ability are abilities corresponding to the second level. In addition, in some embodiments, the pollen puff ability and the leaf tornado ability corresponds to the second level and the leaf ability. That is, the leaf ability is an ability corresponding to a current key position in the primary form, and the pollen puff ability and the leaf tornado ability are abilities corresponding to the current key position in the intermediate form.

In some embodiments, the at least two second ability identifiers displayed in the interface are identifiers corresponding to at least two preset second abilities; or the at least two second ability identifiers displayed in the interface are identifiers corresponding to at least two second abilities selected from a preset ability library corresponding to the second level.

Step 1003. Display ability configuration prompt information in preset positions on peripheral sides of the second ability identifiers when the at least two second ability identifiers are displayed, where the ability configuration prompt information is used for indicating the ability configuration structures of the second abilities.

In some embodiments, the ability configuration structure of the second ability includes at least one of configuration information such as attribute, function, rarity, attack performance, defense performance, subsidiarity, and the like corresponding to the second ability.

Figure 11:
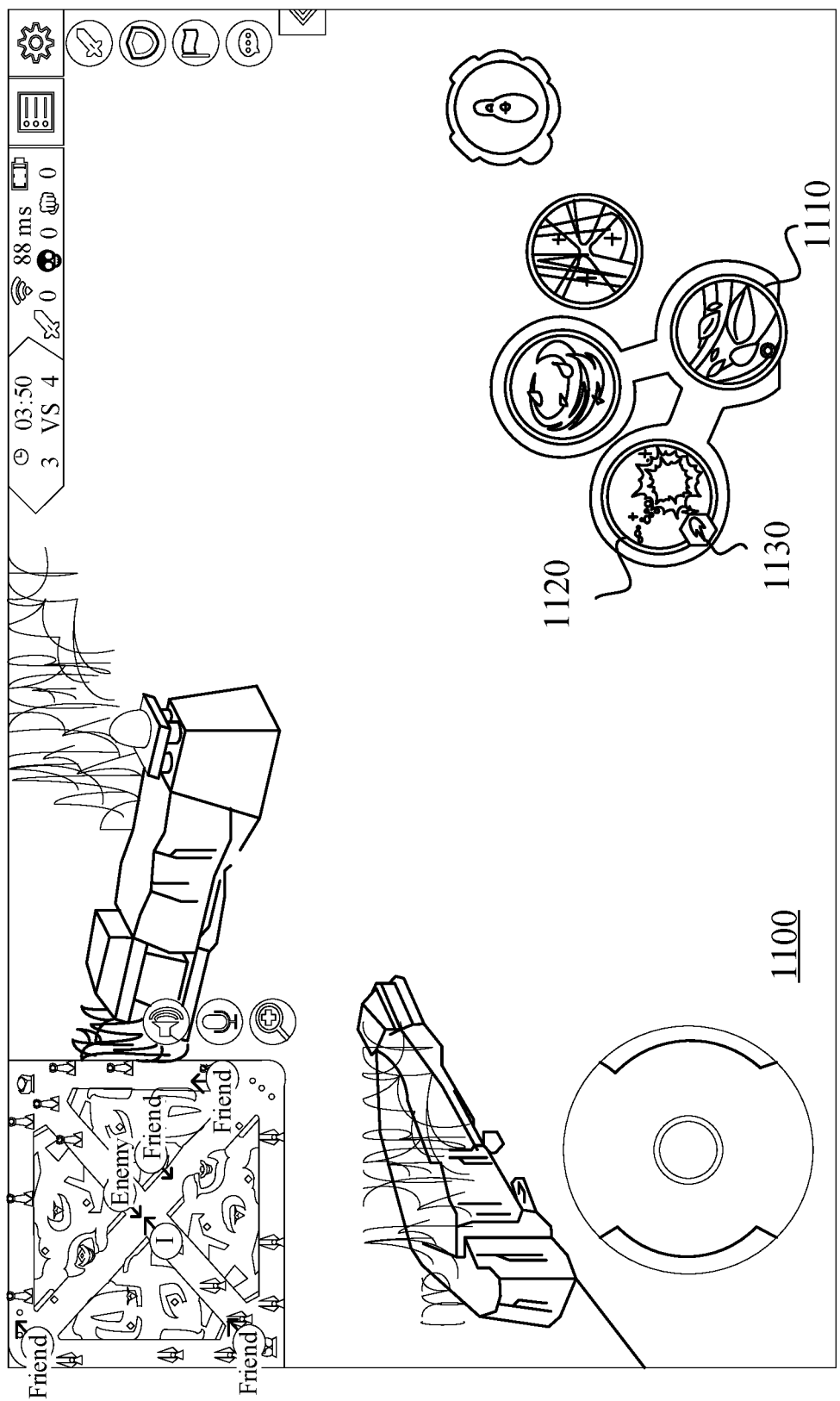
FIG. 11 is a schematic diagram of a display interface of ability configuration prompt information according to the embodiment shown in FIG. 10.

For example, referring to FIG. 11, a virtual battle interface 1100 displays a first ability identifier 1110 and a second ability identifier 1120. Ability configuration prompt information 1130 is displayed in a preset position on a peripheral side of the second ability identifier 1120, as shown in FIG. 11, in a lower left corner of the second ability identifier 1120, referring to the ability configuration prompt information 1130 in FIG. 11, and the ability configuration prompt information 1130 is used for indicating that a second ability corresponding to the second ability identifier 1120 belongs to an attack ability and the second ability belongs to a rare ability.

In some embodiments, the ability configuration prompt information is used for indicating configuration information through color, frequent blinking, highlighting, pattern, shape, or another manner.

Step 1004. Replace the first ability with a second ability corresponding to the target second ability identifier in response to a selection operation on the target second ability identifier.

The foregoing target second ability identifier is an identifier selected by the player from the at least two second ability identifiers.

In some embodiments, after the first ability is replaced with the second ability according to the foregoing selection operation, ability operation guide information is displayed in a virtual environment interface, and the foregoing ability operation guide information is used as a reminder of operation-related content of the second ability corresponding to the target second ability identifier. In some embodiments, the content presented by the foregoing operation guide information includes at least one of a casting path, a casting range, a trigger manner, a trigger effect, and other information of the second ability. In some embodiments, the presentation form of the foregoing operation guide information includes one of an animation form, a text form, a voice form, and the like.

In conclusion, in the method for selecting an ability of a virtual object provided in this embodiment of this application, at least two second ability identifiers are displayed when a virtual object is changed to a second level, and a selected second ability replaces a first ability to serve as an evolved ability of the virtual object. Because the second ability is selected from at least two candidate second abilities, diversity of ability evolution is increased, and strategization of a virtual battle is improved, to avoid a problem that relatively weak strategization of the virtual battle is caused because of relatively undiversified ability configuration, thereby improving experience of a player in the virtual battle.

In the method provided in this embodiment, the ability configuration prompt information is displayed in the preset position on the peripheral side of the second ability identifier, thereby indicating the configuration structure of the second ability corresponding to the second ability identifier, and before selecting the second ability identifier, the player initially understands the second ability, to avoid a problem that the second ability is blindly selected to cause relatively low selection accuracy.

Figure 12:
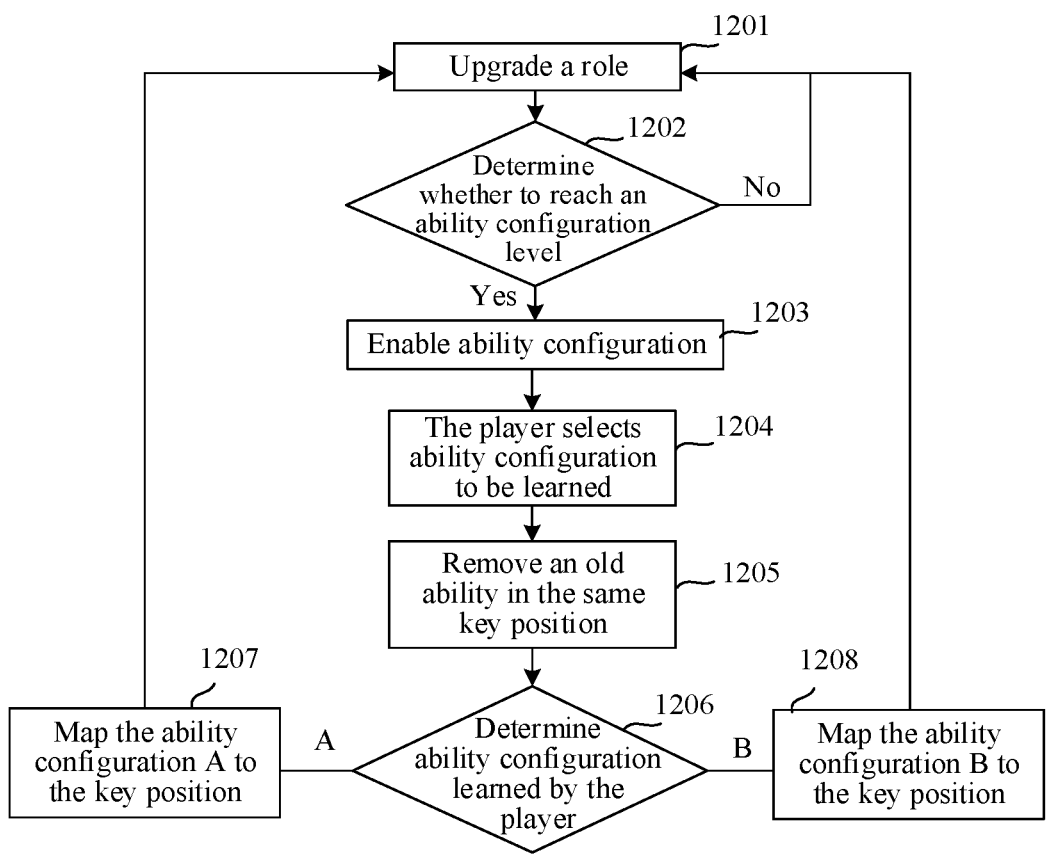
FIG. 12 is an overall flowchart of a method for selecting an ability of a virtual object according to an exemplary embodiment of this application.

For example, FIG. 12 is an overall flowchart of a method for selecting an ability of a virtual object according to an exemplary embodiment of this application. As shown in FIG. 12, the process includes:

Step 1201. Upgrade a role.

That is, a virtual object participating in a virtual battle in a virtual environment is upgraded in level or evolved. For example, using an example in which the virtual object is implemented as a virtual elf, to upgrade the role is to evolve the virtual elf.

Step 1202. Determine whether to reach an ability configuration level.

Ability configuration refers to a process that the player configures an ability for the virtual object. That is, at some levels, the player can configure an ability for the virtual object, and after other levels are upgraded, the player does not have the capability of configuring an ability for the virtual object.

Step 1203. Enable ability configuration when the virtual object reaches the ability configuration level.

In some embodiments, such two candidate ability options as ability configuration A and ability configuration B are provided to the player, that is, the player can select one of the ability configuration A and the ability configuration B to perform ability configuration.

Step 1204. The player selects ability configuration to be learned.

In some embodiments, the ability configuration A and the ability configuration B are ability configurations used for replacing an original ability with new to-be-learned abilities of the virtual object. The player selects one of the ability configuration A and the ability configuration B for a new configured ability of the virtual object.

Step 1205. Remove an old ability in the same key position.

Because the ability configuration A and the ability configuration B are used for replacing the old ability, the old ability in the key position is first removed, thereby adding an ability selected by the player to the key position.

Step 1206. Determine ability configuration learned by the player.

Step 1207. Map the ability configuration A to the key position in response to the player learning the ability configuration A.

Step 1208. Map the ability configuration B to the key position in response to the player learning the ability configuration B.

In conclusion, in the method for selecting an ability of a virtual object provided in this embodiment of this application, at least two second ability identifiers are displayed when a virtual object is changed to a second level, and a selected second ability replaces a first ability to serve as an evolved ability of the virtual object. Because the second ability is selected from at least two candidate second abilities, diversity of ability evolution is increased, and strategization of a virtual battle is improved, to avoid a problem that relatively weak strategization of the virtual battle is caused because of relatively undiversified ability configuration, thereby improving experience of a player in the virtual battle.

Figure 13:
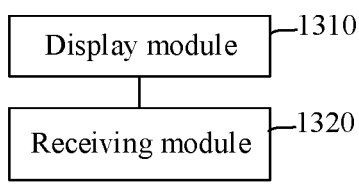
FIG. 13 is a structural block diagram of an apparatus for selecting an ability of a virtual object according to an exemplary embodiment of this application.

FIG. 13 is a structural block diagram of an apparatus for selecting an ability of a virtual object according to an exemplary embodiment of this application. As shown in FIG. 13, the apparatus includes:

a display module 1310, configured to display a first ability identifier of a first ability, the first ability being an ability configured for the virtual object to perform the first ability at a first level in a virtual battle;

the display module 1310 being further configured to display at least two second ability identifiers in response to the virtual object changing from the first level to a second level in the virtual battle, second abilities corresponding to the second ability identifiers being corresponding to the second level; and a receiving module 1320, configured to replace, in response to receiving a selection operation on a target second ability identifier selected from the at least two second ability identifiers, the first ability with a second ability corresponding to the target second ability identifier.

In some embodiments, the display module 1310 is further configured to: cancel displaying the first ability identifier in a target display key position; and display the target second ability identifier in the target display key position of the first ability identifier.

In some embodiments, the at least two second abilities correspond to different ability configuration structures, and the ability configuration structures are used for indicating effect combination situations generated by the abilities; and the first ability and the second abilities have different ability effects.

Figure 14:
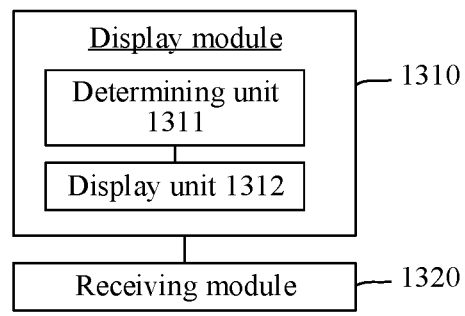
FIG. 14 is a structural block diagram of an apparatus for selecting an ability of a virtual object according to another an exemplary embodiment of this application.

In some embodiments, as shown in FIG. 14, the display module 1310 includes:

a determining unit 1311, configured to: determine an ability set corresponding to the virtual object and the second level; and determine the at least two second abilities from the ability set; and a display unit 1312, configured to display the at least two second ability identifiers corresponding to the at least two second abilities in a preset display position corresponding to the first ability identifier.

In some embodiments, the determining unit 1311 is further configured to: obtain historical behavior data corresponding to the virtual object, where the historical behavior data includes historical ability trigger data of the virtual object; and determine the at least two second abilities triggered for the most number of times from the ability set according to the historical behavior data.

In some embodiments, the display module 1310 is further configured to display the at least two second ability identifiers in a sector display manner with the first ability identifier as a surrounding center;

or the display module 1310 is further configured to display at least two switching paths with the first ability identifier as a path start point, where end points of the switching paths are the at least two second ability identifiers;

or the display module 1310 is further configured to superimpose and display the at least two second ability identifiers in a display position of the first ability identifier.

In some embodiments, the receiving module 1320 is further configured to use a slide operation received between the first ability identifier and the target second ability identifier as the selection operation in response to displaying the switching paths between the first ability identifier and the second ability identifiers, where a slide start position of the slide operation is on the first ability identifier, and a slide termination position of the slide operation is on the target second ability identifier.

In some embodiments, the receiving module 1320 is further configured to receive the slide operation between the first ability identifier and the target second ability identifier; and the display module 1310 is further configured to: display an ability effect preview animation of the target second ability identifier according to the slide operation; and determine the slide operation as the selection operation on the target second ability identifier in response to end of the slide operation and a slide termination position of the slide operation being on the target second ability identifier.

In some embodiments, the display module 1310 is further configured to display ability configuration prompt information in preset positions on peripheral sides of the second ability identifiers in response to displaying the at least two second ability identifiers, where the ability configuration prompt information is used for indicating the ability configuration structures of the second abilities.

In conclusion, in the apparatus for selecting an ability of a virtual object provided in this embodiment of this application, at least two second ability identifiers are displayed when a virtual object is changed to a second level, and a selected second ability identifier replaces a first ability to serve as an evolved ability of the virtual object. Because the second ability is selected from at least two candidate second abilities, diversity of ability evolution is increased, and strategization of a virtual battle is improved, to avoid a problem that relatively weak strategization of the virtual battle is caused because of relatively undiversified ability configuration, thereby improving experience of a player in the virtual battle.

The apparatus for selecting an ability of a virtual object provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the content described above.

This application further provides a terminal, the terminal includes a processor and a memory, the memory stores at least one instruction, and the at least one instruction is loaded and executed by the processor to implement steps of performing the method for selecting an ability of a virtual object performed by the first terminal or by the second terminal. The terminal may be a terminal provided in FIG. 15 below.

Figure 15:
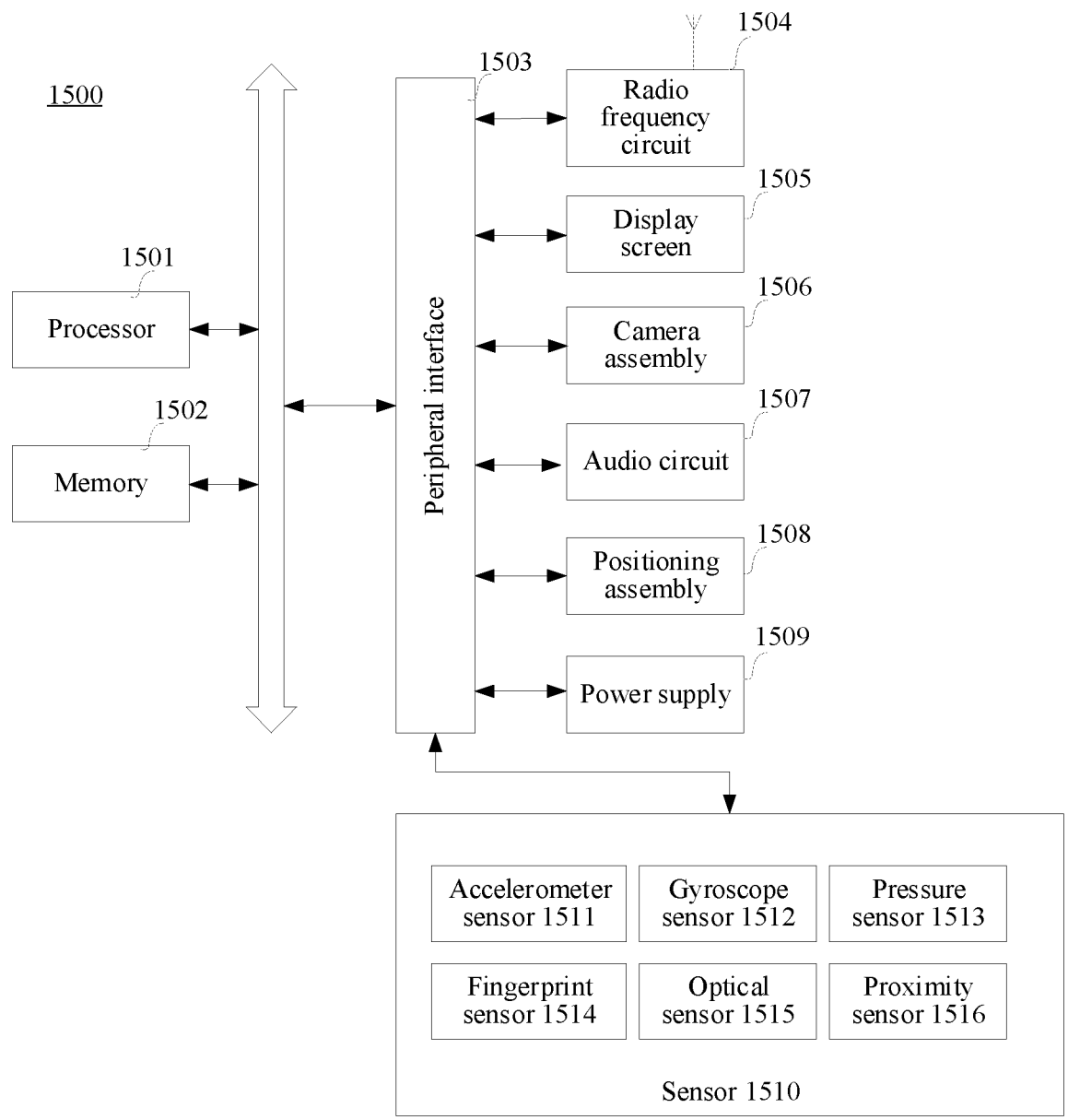
FIG. 15 is a structural block diagram of a terminal according to an exemplary embodiment of this application.

FIG. 15 shows a structural block diagram of a terminal 1500 according to an exemplary embodiment of this application. The terminal 1500 may be: a smartphone, a pad, a Moving Picture Experts Group Audio Layer III (MP3) player, a Moving Picture Experts Group Audio Layer IV (MP4) player, a laptop, or a desktop. The terminal 1500 may also be referred to as other names such as user equipment, a portable terminal, a laptop terminal, and a desktop terminal.

Generally, the terminal 1500 includes: a processor 1501 and a memory 1502.

The processor 1501 may include one or more processing cores, such as a 4-core processor or an 8-core processor.

The memory 1502 may include one or more computer-readable storage media, which may be non-transitory. The memory 1502 may also include a high-speed random access memory, as well as non-volatile memory, such as one or more disk storage devices and flash storage devices. In some embodiments, a non-transitory computer-readable storage medium in the memory 1502 is configured to store at least one instruction, the at least one instruction being configured to be executed by the processor 1501 to implement the method for selecting an ability of a virtual object provided in the method embodiments of this application.

In some embodiments, the terminal 1500 also includes: a peripheral interface 1503 and at least one peripheral. The processor 1501, the memory 1502 and the peripheral interface 1503 may be connected by a bus or a signal line. Each peripheral may be connected to the peripheral interface 1503 by a bus, signal line, or a circuit board. Specifically, the peripheral includes at least one of: a radio frequency (RF) circuit 1504, a touchscreen 1505, a camera 1506, an audio circuit 1507, a positioning assembly 1508, or a power supply 1509.

The peripheral interface 1503 may be configured to connect at least one peripheral related to input/output (I/O) to the processor 1501 and the memory 1502.

The RF circuit 1504 is configured to receive and transmit RF signals, also referred to as electromagnetic signals. The RF circuit 1504 communicates with a communication network and other communication devices through the electromagnetic signals. The RF circuit 1504 converts an electric signal into an electromagnetic signal for transmission, or converts a received electromagnetic signal into an electric signal.

The display screen 1505 is configured to display a user interface (UI).

The camera assembly 1506 is configured to capture images or video.

The audio circuit 1507 may include a microphone and a speaker.

The positioning assembly 1508 is configured to position a current geographic location of the terminal 1500 to implement navigation or location based service (LBS).

The power supply 1509 is configured to power the various assemblies in the terminal 1500.

In some embodiments, the terminal 1500 also includes one or more sensors 1510. The one or more sensors 1510 include, but are not limited to: an acceleration sensor 1511, a gyroscope sensor 1512, a pressure sensor 1513, a fingerprint sensor 1514, an optical sensor 1515, and a proximity sensor 1516.

It will be appreciated by those skilled in the art that the structure shown in FIG. 15 is not limiting of the terminal 1500 and may include more or fewer assemblies than illustrated, or some assemblies may or combined, or different assembly arrangements may be employed.

The memory further includes one or more programs. The one or more programs are stored in the memory. The one or more programs include a program for performing the method for selecting an ability of a virtual object provided in the embodiments of this application.

An embodiment of this application further provides a computer-readable storage medium. The storage medium stores at least one instruction, and at least one instruction is loaded and executed by a processor, to implement the method for selecting an ability of a virtual object according to the foregoing method embodiments.

An embodiment of this application further provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the method for selecting an ability of a virtual object described in any one of the foregoing embodiments.

The sequence numbers of the foregoing embodiments of this application are merely for description purpose, and are not intended to indicate the preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for selecting an ability of a virtual object in a virtual battle performed by a computer device, the method comprising:
    displaying a first ability identifier of a first ability associated with the virtual object, the first ability being an ability configured for the virtual object to perform at a first level in a virtual battle;
    displaying at least two second ability identifiers of at least two second abilities associated with the virtual object in response to the virtual object changing from the first level to a second level in the virtual battle, the second abilities corresponding to the second level, and the at least two second ability identifiers comprising a target second ability identifier; and
    replacing the first ability and the first ability identifier with a second ability corresponding to the target second ability identifier and the target second ability identifier, respectively, in response to a selection operation on the target second ability identifier.

2. The method according to claim 1, wherein the target second ability identifier is selected by default.

3. The method according to claim 1, wherein the replacing the first ability with a second ability corresponding to the target second ability identifier comprises:
    canceling displaying the first ability identifier in a target display key position; and
    displaying the target second ability identifier in the target display key position.

4. The method according to claim 3, wherein
    the at least two second abilities correspond to different ability configuration structures, and the ability configuration structures are used for indicating effect combination situations generated by the at least two second abilities; and
    the first ability and the second abilities have different ability effects.

5. The method according to claim 1, wherein the displaying at least two second ability identifiers comprises:
    determining an ability set corresponding to the virtual object and the second level;
    determining the at least two second abilities from the ability set; and
    displaying the at least two second ability identifiers corresponding to the at least two second abilities in a preset display position, wherein the preset display position corresponds to the first ability identifier.

6. The method according to claim 5, wherein the determining the at least two second abilities from the ability set comprises:
    obtaining historical behavior data corresponding to the virtual object, wherein the historical behavior data comprises historical ability trigger data of the virtual object; and
    determining the at least two second abilities triggered for the most number of times from the ability set according to the historical behavior data.

7. The method according to claim 1, wherein the displaying at least two second ability identifiers comprises:
    displaying the at least two second ability identifiers in a sector display manner with the first ability identifier as a surrounding center;
    displaying at least two switching paths with the first ability identifier as a path start point, wherein end points of the switching paths are the at least two second ability identifiers; or
    superimposing and displaying the at least two second ability identifiers in a display position of the first ability identifier.

8. The method according to claim 7, further comprising:
    using a slide operation received between the first ability identifier and the target second ability identifier as the selection operation in response to displaying the switching paths between the first ability identifier and the second ability identifiers.

9. The method according to claim 8, wherein the using a slide operation received between the first ability identifier and the target second ability identifier as the selection operation comprises:
    receiving the slide operation between the first ability identifier and the target second ability identifier;
    displaying an ability effect preview animation of the target second ability identifier according to the slide operation; and
    determining the slide operation as the selection operation on the target second ability identifier in response to end of the slide operation and a slide termination position of the slide operation being on the target second ability identifier.

10. The method according to claim 1, further comprising:
    displaying ability configuration prompt information in preset positions on peripheral sides of the second ability identifiers in response to displaying the at least two second ability identifiers, wherein the ability configuration prompt information is used for indicating the ability configuration structures of the second abilities.

11. A computer device, comprising a processor and a memory, the memory storing at least one instruction, the at least one instruction being loaded and executed by the processor and causing the computer device to implement a method for selecting an ability of a virtual object, the method including:

displaying a first ability identifier of a first ability associated with the virtual object, the first ability being an ability configured for the virtual object to perform the first ability at a first level in a virtual battle;

displaying at least two second ability identifiers of at least second abilities associated with the virtual object in response to the virtual object changing from the first level to a second level in the virtual battle, the second abilities corresponding to the second level, and the at least two second ability identifiers comprising a target second ability identifier; and replacing the first ability and the first ability identifier with a second ability corresponding to the target second ability identifier and the target second ability identifier, respectively, in response to a selection operation on the target second ability identifier.

12. The computer device according to claim 11, wherein the replacing the first ability with a second ability corresponding to the target second ability identifier comprises:

canceling displaying the first ability identifier in a target display key position; and displaying the target second ability identifier in the target display key position.

13. The computer device according to claim 12, wherein the at least two second abilities correspond to different ability configuration structures, and the ability configuration structures are used for indicating effect combination situations generated by the at least two second abilities; and the first ability and the second abilities have different ability effects.

14. The computer device according to claim 11, wherein the displaying at least two second ability identifiers comprises:

determining an ability set corresponding to the virtual object and the second level;

determining the at least two second abilities from the ability set; and displaying the at least two second ability identifiers corresponding to the at least two second abilities in a preset display position, wherein the preset display position corresponds to the first ability identifier.

15. The computer device according to claim 14, wherein the determining the at least two second abilities from the ability set comprises:

obtaining historical behavior data corresponding to the virtual object, wherein the historical behavior data comprises historical ability trigger data of the virtual object; and determining the at least two second abilities triggered for the most number of times from the ability set according to the historical behavior data.

16. The computer device according to claim 11, wherein the displaying at least two second ability identifiers comprises:

displaying the at least two second ability identifiers in a sector display manner with the first ability identifier as a surrounding center;

displaying at least two switching paths with the first ability identifier as a path start point, wherein end points of the switching paths are the at least two second ability identifiers; or superimposing and displaying the at least two second ability identifiers in a display position of the first ability identifier.

17. The computer device according to claim 11, wherein the method further comprises:

displaying ability configuration prompt information in preset positions on peripheral sides of the second ability identifiers in response to displaying the at least two second ability identifiers, wherein the ability configuration prompt information is used for indicating the ability configuration structures of the second abilities.

18. A non-transitory computer-readable storage medium, storing at least one instruction stored therein; the at least one instruction being loaded and executed by a processor of a computer device and causing the computer device to implement a method for selecting an ability of a virtual object, the method including:

displaying a first ability identifier of a first ability associated with the virtual object, the first ability being an ability configured for the virtual object to perform the first ability at a first level in a virtual battle;

displaying at least two second ability identifiers of at least second abilities associated with the virtual object in response to the virtual object changing from the first level to a second level in the virtual battle, the second abilities corresponding to the second level, and the at least two second ability identifiers comprising a target second ability identifier; and replacing the first ability and the first ability identifier with a second ability corresponding to the target second ability identifier and the target second ability identifier, respectively, in response to a selection operation on the target second ability identifier.

* * * * *